United States Patent [19]

Miyoshi et al.

[11] Patent Number: 4,678,697
[45] Date of Patent: Jul. 7, 1987

[54] MAGNETIC RECORDING MEDIUM

[75] Inventors: Takahito Miyoshi; Masaaki Fujiyama; Toshimitu Okutu; Kenichi Masuyama; Norio Nasu, all of Kanagawa, Japan

[73] Assignee: Fuji Photo Film Co., Ltd., Kanagawa, Japan

[21] Appl. No.: 702,550

[22] Filed: Feb. 19, 1985

[30] Foreign Application Priority Data

Feb. 17, 1984 [JP] Japan .................................. 59-28135

[51] Int. Cl.⁴ .............................................. G11B 5/68
[52] U.S. Cl. .................................... 428/141; 427/131; 428/323; 428/328; 428/332; 428/694; 428/900
[58] Field of Search ............... 428/694, 900, 328, 141, 428/323, 332; 427/131

[56] References Cited

U.S. PATENT DOCUMENTS

| | | | |
|---|---|---|---|
| 4,135,031 | 1/1979 | Akashi et al. ........................ | 427/131 |
| 4,474,843 | 10/1984 | Miyoshi et al. ...................... | 427/131 |
| 4,532,178 | 7/1985 | Matsumoto .......................... | 427/131 |
| 4,547,425 | 10/1985 | Naruse ................................. | 428/694 |
| 4,555,431 | 11/1985 | Miyatsuka ........................... | 427/131 |
| 4,562,117 | 12/1985 | Kikukawa et al. .................. | 428/694 |

Primary Examiner—Paul J. Thibodeau
Attorney, Agent, or Firm—Sughrue, Mion, Zinn, Macpeak, and Seas

[57] ABSTRACT

A magnetic recording medium is described, comprising a non-magnetic support having coated thereon on opposite surfaces a magnetic layer containing a magnetic substance and a binder-containing backing layer, wherein the magnetic layer has a light transmittance of 2% or more for light having a wavelength of 900 nm, the backing layer has a transmittance of from 1 to 10% for light having a wavelength of 900 nm, the magnetic recording medium as a whole has a transmittance of 1% or less for light having a wavelength of 900 nm, and the backing layer has a center line average roughness (Ra) of 0.05 μm or less at a cut-off value of 0.08 mm.

12 Claims, 1 Drawing Figure

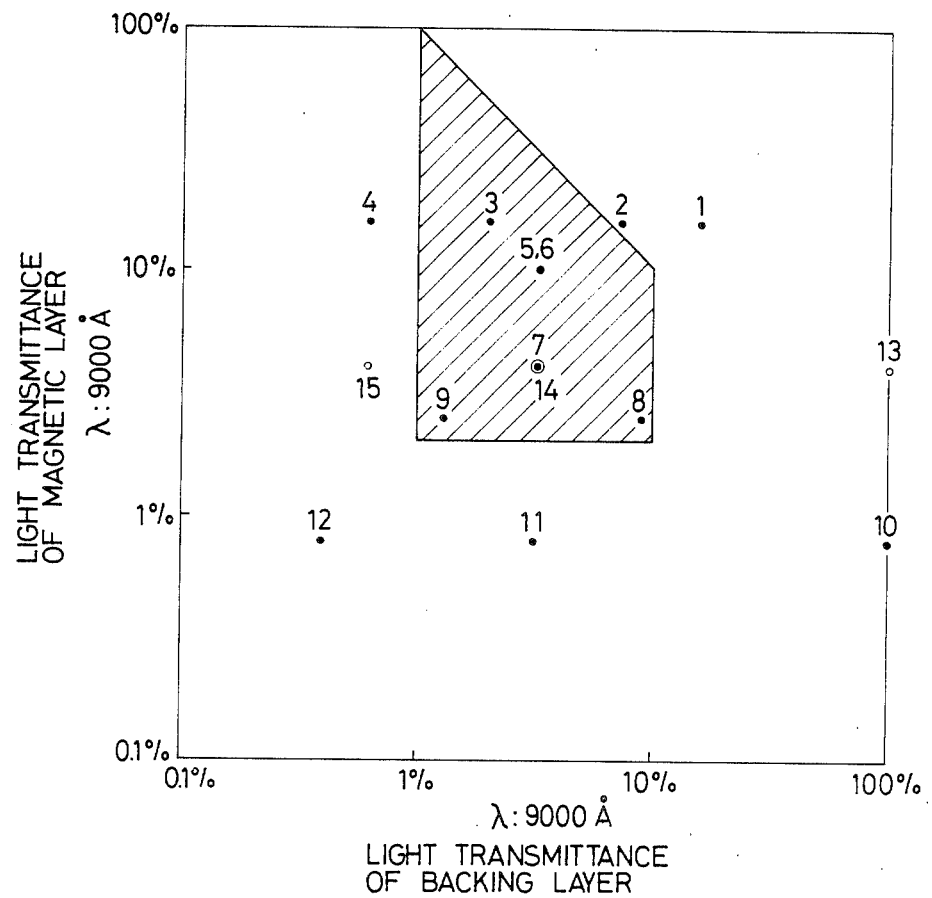

MAGNETIC RECORDING MEDIUM

FIELD OF THE INVENTION

The present invention relates to a magnetic recording medium, and more particularly it relates to a magnetic recording medium having excellent electromagnetic properties and running durability.

BACKGROUND OF THE INVENTION

In magnetic recording tapes for video and audio recording, the surface of the magnetic layer is generally made smooth to improve sensitivity and output, particularly in a high frequency region.

It has also been proposed to provide a backing layer to improve the running properties of such magnetic tapes as described, for example, in U.S. Pat. No. 4,135,031. However, conventionally used backing layers have rather coarse surfaces, and their unevenness tends to be imprinted on the magnetic layer.

In order to produce video tapes having higher S/N and to improve the packing density of ferromagnetic particles therein, it has been proposed to make the ferromagnetic particles finer and to reduce the amount of additive particles other than ferromagnetic particles, e.g., the amount of carbon black to a value as small as possible. However, when the ferromagnetic particles are made finer and the amount of carbon black in the magnetic layer is reduced, the optical density decreases, and the magnetic tapes tend to stop running and to become electrically charged, resulting in deterioration of the running durability of the tapes.

SUMMARY OF THE INVENTION

An object of the present invention is to provide a magnetic recording medium having particularly excellent electromagnetic properties and running durability.

As a result of extensive research as to the physical properties of magnetic layers, backing layers, and magnetic tapes as a whole, it has now been found that the above-described problems can be solved by adjusting the light transmittance of each layer to a predetermined level and by adjusting the surface roughness of the backing layer.

That is, the present invention provides a magnetic recording medium comprising a non-magnetic support having coated on each surface thereof a magnetic layer containing a magnetic substance and a binder-containing backing layer, wherein the magnetic layer has a light transmittance of 2% or more for light having a wavelength of 900 nm, the backing layer has a transmittance of from 1 to 10% for light having a wavelength of 900 nm, the magnetic recording medium as a whole has a transmittance of 1% or less for light having a wavelength of 900 nm, and the surface roughness of the backing layer as defined by the center line average roughness (Ra) at a cut-off value of 0.08 mm is 0.05 $\mu$m or less.

BRIEF DESCRIPTION OF DRAWINGS

The FIGURE is a graph showing relationship of light transmittance among the magnetic layer, the backing layer and the magnetic tape as a whole. Samples Nos. 3, 5, 7, 8, 9, and 14 indicated in FIG. 1 are examples of the present invention, and Samples Nos. 1, 2, 4, 6, 10, 11, 12, 13, and 15 are comparative examples (The backing layer of Sample No. 6 has a center line average roughness Ra of 0.06 $\mu$m at a cut-of value of 0.08 mm).

Thus, in the FIGURE, the shaded area represents the range of the present invention with respect to the light transmittance characteristics.

DETAILED DESCRIPTION OF THE INVENTION

The light transmittance of the magnetic layer of the present invention for light having a wavelength of 900 nm is 2% or more, and preferably 3% or more.

The light transmittance of the backing layer for light having a wavelength of 900 nm according to the present invention is from 1 to 10%, and preferably from 1.5 to 8%.

The backing layer of the present invention preferably has a thickness of 2 $\mu$m or less, and more preferably the thickness is from 0.4 to 1.5 $\mu$m. The backing layer has a smooth surface, and particularly has a center line average roughness (Ra) of 0.05 $\mu$m or less, and preferably 0.03 $\mu$m or less, at a cut-off value of 0.08 mm.

By adjusting the light transmittance of the magnetic recording medium as a whole for light having a wavelength of 900 nm to 1% or less, the magnetic tape having provided thereon a magnetic layer and a backing layer can have excellent electromagnetic properties, particularly S/N (signal/noise) ratio, which conventional video tapes for broadcasting having provided thereon a magnetic layer and a backing layer have not been able to attain.

In a coated tape magnetic layer using Co-containing magnetic iron oxide, the S/N ratio is excellent when the magnetic particles have a specific surface area $S_{BET}$ of 35 m$^2$/g or more and carbon black is used in a small amount, that is, the packing density is high and light transmittance is high. The S/N ratio is abruptly improved when the light transmittance for light having a wavelength of 900 nm is 2% or more.

Also, in order to have an excellent S/N ratio, the backing layer preferably has a smooth surface so that unevenness of the backing layer is not imprinted on a magnetic layer. In order to have excellent running durability, the light transmittance for light having a wavelength of 900 nm is preferably 1% or more. If the light transmittance is not higher than 1%, the running durability of magnetic tapes is deteriorated, the backing layer quickly wears out, and the number of drop out increases. If the light transmittance exceeds 10%, the optical density is insufficient and magnetic tapes mounted on a video tape recorder (VTR) of the VHS type tend to stop running when the magnetic layer has a high S/N ratio.

Colored particles such as carbon black graphite, titanium oxide, and titanium carbide can be added to adjust the light transmittance of the magnetic layer and the backing layer.

The carbon black is not limited and any conventional carbon black can be used. The particle size thereof is preferably from 5 to 250 $\mu$m and carbon black having various particle sizes can be used in combination.

Titanium oxide particles can be obtained by reducing titanium dioxide particles. For example, a detailed explanation is provided in Japanese Patent Application (OPI) No. 91037/83 (the term "OPI" as used herein refers to a "published unexamined Japanese Patent Application").

The particle size of the colored particles is preferably from 5 to 25 $\mu$m.

The colored particles are preferably used in an amount of 10 parts by weight or less and more preferably in an amount of 7 parts by weight or less per 100 parts by weight of the magnetic substance in the magnetic layer.

The colored particles are preferably used in the backing layer in an amount of 30 parts by weight or more, and more preferably from 30 to 200 parts by weight per 100 parts by weight of the binder contained in the backing layer.

The magnetic layer of the present invention can be a conventionally coated type magnetic layer containing Co-containing magnetic iron oxide as described, e.g., in U.S. Pat. No. 4,135,031, or a thin ferromagnetic metal film type magnetic layer prepared, e.g., by vapor deposition method such as vacuum evaporation, sputtering or ion plating as described, e.g., in U.S. Pat. Nos. 4,097,650 and 4,172,171. When Co-containing magnetic iron oxide is used, particles having a specific surface area of 35 $m^2/g$ or more are preferred.

Conventionally used binders, lubricating agents, abrasive agents and the like can be used in the magnetic layer, particularly in the coated type magnetic layer. Specific examples of materials and methods for preparing the magnetic layer are disclosed, e.g., in U.S. Pat. No. 4,135,016.

The binders can be those conventionally used in magnetic recording media, such as cellulose derivatives (nitrocellulose, cellulose propionate), vinyl chloride-vinyl acetate resins, and further including those containing a vinyl alcohol or maleic acid, polyurethanes, epoxy resins, polyamides, polyisocyanates, and polyesters. The binders can be used in an amount of 10 to 50 parts by weight per 100 parts by weight of the magnetic substance. The abrasive agents include $\alpha\text{-Al}_2\text{O}_3$, $\text{Cr}_2\text{O}_3$, SiC, and $\alpha\text{-Fe}_2\text{O}_3$. The amount of the abrasive which can be used is 0.001 to 20 parts by weight per 100 parts by weight of the magnetic substance. A dispersing agent such as lecithin, a plasticizer such as TPP or DBP, and a stabilizing agent such as lead stearate can also be added, if desired. The amounts of the dispersing agent, plasticizer and stabilizing agent are 0 to 10 parts by weight, 0 to 5 parts by weight and 0 to 5 parts by weight, respectively, per 100 parts by weight of the magnetic substance. Inorganic particles such as silica, $\text{CaCO}_3$, or talc can be added in an amount of 0 to 100 parts by weight per 100 parts by weight of the colored particles in the backing layer.

In addition to the colored particles, inorganic particles can be mixed and kneaded with binders in the backing layer, if desired. Examples of preferred inorganic particles include calcium carbonate, barium sulfide, ZnS, $\text{MgCO}_3$, ZnO, $\text{Fe}_3\text{O}_4$, $\text{SnO}_2$, $\text{SiO}_2$, $\text{Cr}_2\text{O}_3$, $\alpha\text{-Al}_2\text{O}_3$, and SiC.

The binders used in the backing layer include those conventionally used, such as thermoplastic resins, thermosetting resins, reactive type resins, or mixtures thereof.

The thermoplastic resins include a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, urethane elastomer, polyvinyl fluoride, a vinylidene chloride-acrylonitrile copolymer, a butadiene and acrylonitrile copolymer, polyamide resin, polyvinyl butyral, a cellulose type resin (cellulose acetate butyrate, cellulose diacetate, cellulose propionate, nitrocellulose and the like), a styrene-butadiene copolymer, a polyester resin, a chlorovinyl ether-acrylate copolymer, an amide resin, and various rubber type resins as described, e.g., in U.S. Pat. No. 4,135,031.

Examples of the thermosetting resins or reactive type resins include a phenol resin, an epoxy resin, a curable polyurethane resin, a urea resin, a melamine resin, an alkyd resin, an acrylic reactive resin, polyisocyanate and polyamine.

The mixing weight ratio of particles to binder used in the backing layer (P/B ratio) is preferably from 1/0.5 to 1/3.5 and more preferably from 1:0.7 to 1:3.0. If the particles are contained in an excessive amount, the particles tend to more easily drop off, whereas if the particles are contained in a very small amount, the friction coefficient increases.

The backing layer of the present invention can contain a lubricating agent which is generally used for magnetic tapes, or can be coated with the lubricating agent.

The present invention will be illustrated in more detail by examples. In the examples, all parts are by weight.

EXAMPLE 1

On opposite surfaces of a polyethylene terephthalate film having a thickness of 14 μm, a magnetic layer containing Co-containing magnetic iron oxide having a predetermined specific surface area and a backing layer having a dry thickness of 1 μm were provided. The coating compositions for the magnetic layer and the backing layer were as follows.

| Coating composition for the magnetic layer: | |
| --- | --- |
| Co-Containing Magnetic Iron Oxide (predetermined specific surface area $S_{BET}$ are shown in Table 1) | 100 parts |
| Vinyl Chloride-Vinyl Acetate Copolymer (Molecular Weight: 73000) | 12 parts |
| Polyurethane Resin (Molecular Weight: 75000) | 7 parts |
| $\alpha\text{-Al}_2\text{O}_3$ (Average Particle Size: 0.3 μm) | 1 part |
| Carbon Black (Average Particle Size: 40 mμ) | Amounts shown in Table 1 |
| Stearic Acid | 1 part |
| Oleic acid | 0.5 part |
| Butyl Stearate | 1 part |
| Polyisocyanate ("Coronate L", trademark of Nippon Polyurethane Co., Ltd.) (an adduct of tolylene diisocyanate and trimethylolpropane, Molecular Weight: 620) | 11 parts |
| Butyl Acetate | 100 parts |
| Methyl Ethyl Ketone | 200 parts |
| Coating composition for the backing layer: | |
| Carbon Black (average particle size: 40 mμ) | Amounts shown in Table 1 |
| Nitrocellulose | 40 parts |
| Polyurethane Resin (Molecular Weight: 75000) | 30 parts |
| Polyisocyanate ("Coronate L", trademark of Nippon Polyurethane Co., Ltd.) (an adduct of tolylene diisocyanate and trimethylolpropane, Molecular Weight: 620) | |
| Methyl Ethyl Ketone | 600 parts |

The thus obtained magnetic tapes were slit to a width of ½ inch to prepare Sample Nos. 1 to 12.

EXAMPLE 2

On opposite surfaces of a polyethylene terephthalate film having a thickness of 12 μm, a Co-Ni (Ni content: 20 wt%) magnetic layer was provided by an oblique vapor deposition method to have a thickness of 0.15 μm and a backing layer was provided to have a dry thickness of 1 μm. The thus obtained magnetic tape was slit to a width of ½ inch to prepare Sample Nos. 13 to 15.

The various characteristics of tape samples Nos. 1 to 15 were measured or evaluated in the following manner and the results obtained are set forth in Table 1.

(1) Number of Drop Outs:

The number of drop out having 15 μs per one minute on Samples after 100 passes was counted by a drop out counter, model "VD-3D", manufactured by Victor Company of Japan Ltd.

(2) Color S/N:

Sample tapes were replayed using a VTR model "NV-8300", manufactured by Matsushita Electric industries Co., Ltd. Color S/N was measured by "Noise meter 925C" manufactured by Shibasoku K.K. using the 10 KHz high-pass filter and the 500 KHz low-pass filter. Color S/N is shown as a relative value based on Sample No. 10 (0 dB) in Sample Nos. 1 to 12 and by a relative value based on Sample No. 13 in Sample Nos. 13 to 15.

(3) Light Transmittance:

The light transmittance of magnetic tapes was measured using a recording spectrophotometer, "EPS-3T", manufactured by Hitachi Ltd.

TABLE 1

| Sample No. | Specific Surface Area $S_{BET}$ of Co-Containing Magnetic iron oxide (m²/g) | Carbon Black (parts by weight) | Carbon Black in a backing layer (parts by weight) |
|---|---|---|---|
| 1 | 55 | 0.2 | 30 |
| 2 | 55 | 0.2 | 50 |
| 3 | 55 | 0.2 | 100 |
| 4 | 55 | 0.2 | 150 |
| 5 | 45 | 0.5 | 70 |
| 6 | 45 | 0.5 | 70 |
| 7 | 40 | 1.5 | 70 |
| 8 | 35 | 3 | 40 |
| 9 | 35 | 3 | 120 |
| 10 | 28 | 7 | Backing layer was not provided |
| 11 | 28 | 7 | 70 |
| 12 | 28 | 7 | 200 |
| 13 | | | Backing layer was not provided |
| 14 | Magnetic layer prepared by vapor deposition | | 70 |
| 15 | | | 150 |

| Sample No. | Center Line Average Roughness Ra at a cut off of 0.08 mm of backing layer (μm) | Light Transmittance (%) (λ: 900 nm) Magnetic Layer | Light Transmittance (%) (λ: 900 nm) Backing Layer | Magnetic Tape (as a whole) |
|---|---|---|---|---|
| 1 | 0.021 | 15.8 | 15.8 | 2.5 |
| 2 | 0.023 | 15.8 | 7.1 | 1.1 |
| 3 | 0.025 | 15.8 | 2.0 | 0.32 |
| 4 | 0.035 | 15.8 | 0.63 | 0.10 |
| 5 | 0.024 | 10.0 | 3.2 | 0.32 |
| 6 | 0.060* | 10.0 | 3.2 | 0.32 |
| 7 | 0.024 | 4.0 | 3.2 | 0.13 |
| 8 | 0.022 | 2.5 | 8.9 | 0.22 |
| 9 | 0.030 | 2.5 | 1.3 | 0.032 |
| 10 | Backing layer was not provided | 0.79 | — | 0.79 |
| 11 | 0.024 | 0.79 | 3.2 | 0.025 |
| 12 | 0.040 | 0.79 | 0.40 | 0.003 |
| 13 | Backing layer was not provided | 4.0 | — | 4.0 |
| 14 | 0.024 | 4.0 | 3.2 | 0.13 |
| 15 | 0.035 | 4.0 | 0.63 | 0.025 |

| Sample No. | Color S/N (dB) | Number of Drop out per min. | Total Evaluation |
|---|---|---|---|
| 1 | +3.5 | 2 | D |
| 2 | +3.5 | 2 | D |
| 3 | +3.5 | 1 | A |
| 4 | +3.4 | 50 | D |
| 5 | +2.6 | 2 | A |
| 6 | +1.8 | 30 | D |
| 7 | +1.8 | 3 | A |
| 8 | +1.0 | 2 | A |
| 9 | +1.0 | 7 | B |
| 10 | 0 | 2 | C |
| 11 | 0 | 3 | C |
| 12 | 0 | 80 | D |
| 13 | 0 | 2 | D |
| 14 | +1.0 | 2 | A |
| 15 | 0 | 40 | D |

*As to the backing layer of Sample No. 6, Ra was made a predetermined value by shortening the period of time for dispersing a coating composition.
A: Very good
B: Good
C: Poor
D: Very poor As is clear from Table 1, Samples Nos. 3, 5, 7, 8, 9, and 14, whose magnetic layer, backing layer, and magnetic tape as a whole have light transmittance within the range of the present invention and have center line average roughness Ra of 0.05 μm at a cut-of value of 0.08 mm are excellent in color S/N and the number of drop outs per minute. Samples Nos. 1, 2, 4, 6, 10, 11, 12, 13 and 15, which do not meet at least one of the above-described requirements, do not exhibit such excellent results.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a non-magnetic support having coated on each surface thereof a magnetic layer containing a magnetic substance and a binder-containing backing layer, wherein the backing layer has a thickness of 2 μm or less, wherein the magnetic layer has a light transmittance of 2% or more for light having a wavelength of 900 nm, the backing layer has a transmittance of from 1 to 10% for light having a wavelength of 900 nm, and the magnetic recording medium as a whole has a transmittance of 1% or less for light having a wavelength of 900 nm, and the backing layer has a center line average roughness (Ra) of 0.05 μm or less at a cut-off value of 0.08 mm, wherein one or both of the magnetic layer and the backing layer contains colored particles, at least the magnetic layer containing the colored particles in an amount of not more than 10 parts by weight per 100 parts by weight of the ferromagnetic substance, the magnetic layer further containing Co-containing magnetic iron oxide particles having a specific surface area ($S_{BET}$) of not less than 35 m²/g.

2. A magnetic recording medium as in claim 1, wherein the magnetic layer has a light transmittance of 3% or more for light having a wavelength of 900 nm.

3. A magnetic recording medium as in claim 1, wherein the backing layer has a light transmittance of from 1.5 to 8% for light having a wavelength of 900 nm.

4. A magnetic recording medium as claimed in claim 1, wherein the backing layer has a thickness of from 0.4 to 1.5 μm.

5. A magnetic recording medium as in claim 1, wherein the backing layer has a center line average roughness (Ra) of 0.03 μm or less at a cut-off value of 0.08 mm.

6. A magnetic recording medium as in claim 1, wherein the colored particles are selected from the group consisting of carbon black, titanium oxide, and titanium carbide.

7. A magnetic recording medium as in claim 6, wherein the colored particles consist of carbon black.

8. A magnetic recording medium as in claim 7, wherein the carbon black has an average particle size of 5 to 250 mμ.

9. A magnetic recording medium as in claim 1, wherein the magnetic layer contains the colored particles in an amount of not more than 7 parts by weight per 100 parts by weight of the magnetic substance.

10. A magnetic recording medium as in claim 1, wherein the backing layer contains the colored particles in an amount of not less than 30 parts by weight per 100 parts by weight of the total binder contained in the backing layer.

11. A magnetic recording medium as in claim 10, wherein the backing layer contains the colored particles in an amount of from 30 to 200 parts by weight per 100 parts by weight of the binder contained in the backing layer.

12. A magnetic recording medium as in claim 1, wherein the backing layer contains particulate components in a particle to binder (P/B) ratio of from 1/0.5 to 1/3.5 by weight.

* * * * *